United States Patent
Boomershine et al.

(10) Patent No.: US 8,781,970 B2
(45) Date of Patent: Jul. 15, 2014

(54) SYSTEM, METHOD AND PROGRAM PRODUCT TO DETERMINE RESOLUTION WHEN SOFTWARE INSTALLED ON A COMPUTER IS NOT PROPERLY LICENSED

(75) Inventors: Marna Jo Boomershine, Peoria, AZ (US); Marie Buzniak, Phoenix, AZ (US); Jacque Lyne Henderlite, Glendale, AZ (US); Jamie Beth Marsnik, Minneapolis, MN (US)

(73) Assignee: International Business Machines Corporation, Armonk, NY (US)

( * ) Notice: Subject to any disclaimer, the term of this patent is extended or adjusted under 35 U.S.C. 154(b) by 2666 days.

(21) Appl. No.: 11/179,405

(22) Filed: Jul. 12, 2005

(65) Prior Publication Data

US 2007/0016531 A1 Jan. 18, 2007

(51) Int. Cl.
*H04K 1/00* (2006.01)
*G01B 9/00* (2006.01)

(52) U.S. Cl.
USPC ............ 705/59; 705/51; 705/57; 705/71; 705/75

(58) Field of Classification Search
USPC .............. 705/59, 50, 57, 58; 380/54
See application file for complete search history.

(56) References Cited

U.S. PATENT DOCUMENTS

| | | | |
|---|---|---|---|
| 4,937,863 A | 6/1990 | Robert et al. | |
| 5,671,412 A | 9/1997 | Christiano | |
| 5,745,879 A | 4/1998 | Wyman | |
| 5,790,664 A * | 8/1998 | Coley et al. | 709/203 |
| 6,003,022 A | 12/1999 | Eberhard et al. | |
| 6,389,464 B1 | 5/2002 | Krishnamurthy et al. | 709/220 |
| 6,510,466 B1 | 1/2003 | Cox et al. | |
| 6,526,387 B1 | 2/2003 | Ruffin et al. | |
| 6,546,002 B1 | 4/2003 | Kim | |
| 6,654,788 B1 | 11/2003 | Chance et al. | 709/206 |
| 6,671,818 B1 | 12/2003 | Mikurak | |
| 6,816,882 B1 | 11/2004 | Conner et al. | |
| 6,968,324 B1 | 11/2005 | Ruffin et al. | |
| 7,013,294 B1 | 3/2006 | Sekigawa et al. | |
| 7,062,765 B1 | 6/2006 | Pitzel et al. | |

(Continued)

OTHER PUBLICATIONS

QUEST—A Tool for Automated Performance Dependability, and cost Tradeoff Support—Goettge, RT, et al; 1995.

(Continued)

*Primary Examiner* — Dante Ravetti
(74) *Attorney, Agent, or Firm* — Arthur J. Samodovitz (57) ABSTRACT

Computer system, computer implemented method and computer program product for determining a recommended course of action to resolve an unlicensed software installation of a type of software in a computer of a company. A determination is made as to an amount or level of use of the type of software by the company during a predetermined period of time. A determination is made if the type of software is currently installed on another computer of the company. A determination is made if the software of the unlicensed software installation can be relocated to the other computer of the company and encompassed under another existing license for the other computer. Alternately, automatic evaluations are made of characteristics of the company's use of (a) the type of software which would permit removal of the type of software from all computers of the company, (b) the software installation which would permit removal of the software installation, and (c) the type of software which would permit relocation of the software from the unlicensed software installation to another computer of the company at which the software would be licensed.

13 Claims, 2 Drawing Sheets

(56) References Cited

U.S. PATENT DOCUMENTS

| | | | |
|---|---|---|---|
| 7,133,917 | B2 | 11/2006 | Re et al. |
| 7,168,074 | B1 | 1/2007 | Srinivasa et al. |
| 7,171,546 | B2 * | 1/2007 | Adams .......................... 712/227 |
| 7,188,085 | B2 | 3/2007 | Pelletier |
| 7,225,137 | B1 | 5/2007 | Barritz |
| 7,519,561 | B2 | 4/2009 | Boomershine et al. |
| 2001/0013024 | A1 | 8/2001 | Takahashi et al. |
| 2002/0107809 | A1 * | 8/2002 | Biddle et al. ..................... 705/59 |
| 2002/0178120 | A1 | 11/2002 | Reid et al. |
| 2003/0028440 | A1 | 2/2003 | Allen et al. |
| 2003/0195759 | A1 | 10/2003 | Glassco et al. |
| 2004/0003122 | A1 | 1/2004 | Melillo .......................... 709/246 |
| 2004/0010471 | A1 * | 1/2004 | Lenard et al. ................... 705/59 |
| 2004/0249763 | A1 | 12/2004 | Vardi |
| 2004/0254851 | A1 | 12/2004 | Himeno et al. |
| 2006/0106727 | A1 * | 5/2006 | Yellai et al. ..................... 705/59 |
| 2006/0287960 | A1 | 12/2006 | Marsnik et al. |

OTHER PUBLICATIONS

Tivoli Software "Introducting IBM Tivoli License Manager" ibm.com /redbooks.

Messerschmitt, D.G. et al., "Marketpalce Issues in Software Planning and Design", IEEE Software, May/Jun. 2004, pp. 62-70.

Dixon, R. et al., "Method and Apparatus to Modify CPU Operating Mode Via Test Access Port", Research Disclosure, Jul. 4, 1999, Article 423103, p. 1004.

Non-final office action dated Oct. 9, 2008 for U.S. Appl. No. 11/157,397.

Final office action dated Apr. 15, 2009 for U.S. Appl. No. 11/157,397.

Non-final office action dated Jul. 22, 2008 for U.S. Appl. No. 11/272,298.

Notice of Allowance dated Dec. 3, 2008 for U.S. Appl. No. 11/272,298.

* cited by examiner

SYSTEM, METHOD AND PROGRAM PRODUCT TO DETERMINE RESOLUTION WHEN SOFTWARE INSTALLED ON A COMPUTER IS NOT PROPERLY LICENSED

FIELD OF THE INVENTION

The present invention relates generally to computer systems, and more specifically to a program tool to determine what to do when a software installation on a computer is not covered under an existing software license.

BACKGROUND OF THE INVENTION

Typically, software is licensed not sold. The license includes conditions and restrictions such as (a) a geographic location where (an unlimited number of copies of) the software can be installed, (b) a specific computer CPU serial number in which (an unlimited number of copies of) the software can be installed, (c) a total number of copies which the licensee can install in one or more computers located anywhere, (d) a type of computer (such as production, development, etc.) on which the software can be used, and (e) a maximum size computer (typically expressed in processing power) in which the software can be installed. Often times, one company has multiple licenses that authorize installation of the same type of software, and many copies of the software are installed on different computers of the company. It has proven difficult for many companies to effectively track their licenses and which software copies are licensed when the company is large and has many separate software licenses, software installations and computers. Often times, the result is that one or more software installations are not covered by an existing software license of the company. Usually this is inadvertent, but nevertheless improper. (Often times also, the company has excess software licenses.)

An IBM Tivoli License Manager program is a known software license management program, and is further described in a document entitled "Introducing IBM Tivoli License Manager" by Manoel, et al. which is available from ibm.com/redbooks. Chapter 2 of this document is hereby incorporated by reference as part of the present disclosure. Using this program, when a license is associated with specific installed software, an administrator enters into a database information about the license. To the extent applicable, this information includes maximum size of the computer processor on which the program can be installed, maximum number of copies of the program that can be installed (on any computer), expiration date, specific CPU serial number on which the program can be installed or executed, and geographic location of the processor for executing (an unlimited number of copies of) the program. The Tivoli License Manager program checks whether each installed software program complies with an existing license by applying the licenses to the installations based on a predetermined and set order of conditions. For example, the Tivoli License Manager may be preprogrammed to apply all licenses having one type of condition to the installations, and then determine which installations are not covered by this type of license. Then, the Tivoli License Manager may be preprogrammed to apply all licenses having another type of condition to the remaining installations, and then determine which installations are not covered by either type of license. Then, the Tivoli License Manager may be preprogrammed to apply all licenses having still another type of condition to the still remaining installations, and then determine which installations are not covered by any of the three license, etc. If the Tivoli License Manager has not associated any remaining installed software with a license after all the licenses have been applied, then it is possible that such remaining installed software is not covered under any existing software license. (If any licenses remain after all the software installations are associated with/covered by any of the previously applied licenses, then the Tivoli License Manager deems the remaining licenses as excessive or unnecessary, and they can be terminated to save the company money.)

Copending US Patent Application entitled "System, Method and Program Product To Identify Unutilized or Underutilized Software License", Ser. No. 11/157,397, filed by J. Marsnik, O. Nalamwar and T. Smalley on Jun. 21, 2005 discloses an improved program tool for identifying installed software which is not licensed as well as excess or under utilized licenses. According to this patent application, the improved program tool applies the software licenses in various orders to the software installations, where each order is based on a different prioritization of license conditions. For example, in one order, all licenses with a condition on geographic location are applied first, then all licenses with a condition on total number of copies are applied second, then all licenses with a condition on specific CPU are applied third, etc. In another order, all licenses with a condition on total number of copies are applied first, then all licenses with a condition on geographic location are applied second, then all licenses with a condition on specific CPU are applied third, etc. In still another order, all licenses with a condition on specific CPU are applied first, then all licenses with a condition on total number of copies are applied second, then all licenses with a condition on geographic location are applied third, etc. This patent application is hereby incorporated by reference as part of the present disclosure. After all the licenses are applied in the different orders to the software installations, if none of the licenses covers one or more software installations in any of the orders, then that software installation is not licensed. (Also, if less than all the licenses are needed to cover all the software installations in any of the orders, then the remaining licenses are unnecessary and can be terminated to save the company money.)

While the foregoing techniques are effective in identifying unlicensed software installations, they do not disclose a technique to determine what to do when such unlicensed software installations are identified, other than to simply decommission/delete the unlicensed software installation. This may not be in the best interest of the user/company.

Accordingly, an object of the present invention is to determine what to do when unlicensed software installations are identified, to serve the interest of the user/company.

SUMMARY

The present invention resides in a computer system, computer implemented method and computer program product for determining a recommended course of action to resolve an unlicensed software installation of a type of software in a computer of a company. A determination is made as to an amount or level of use of the type of software by the company during a predetermined period of time. A determination is made if the type of software is currently installed on another computer of the company. A determination is made if the software of the unlicensed software installation can be relocated to the other computer of the company and encompassed under another existing license for the other computer.

In accordance with features of the present invention, recommendations are automatically made based on the foregoing determinations.

The present invention also resides in a computer system, computer implemented method and computer program product for determining a recommended course of action to resolve an unlicensed software installation of a type of software in a computer of a company. Characteristics of the company's use of the type of software which would permit removal of the type of software from all computers of the company are automatically evaluated. Characteristics of the company's use of the software installation which would permit removal of the software installation are automatically evaluated. Characteristics of the company's use of the type of software which would permit relocation of the software from the unlicensed software installation to another computer of the company at which the software would be licensed are automatically evaluated.

DETAILED DESCRIPTION OF THE PREFERRED EMBODIMENTS

The present invention will now be described in detail with reference to the figures. The present invention is implemented with a programmed computer such as computer 10 illustrated in FIG. 1. Computer 10 includes a known CPU 12, operating system 13, RAM 14, ROM 16, disk storage 18, and TCP/IP card 20. Computer 10 also includes a software license review program 22 which compares license conditions and scope of a plurality of software licenses for the same type of software to the actual software installations to determine if all of the software installations are licensed (or "compliant"). (Program 22 also determines if any of the software licenses are not needed at all and therefore can be terminated, i.e. other software license(s) cover/license all the software installations. Program 22 also determines if an individual software license can be reduced in scope, i.e. reduced in the number of copies licensed. Either case will reduce the total license fees for the licensee.) Program 22 can be the known IBM Tivoli License Manager program described above (for certain types of single-condition software licenses) or the software license optimizing program disclosed in US Patent Application entitled "System, Method and Program Product To Identify Unutilized or Underutilized Software License", Ser. No. 11/157,397, filed by J. Marsnik, O. Nalamwar and T. Smalley on Jun. 21, 2005, described above (for a wider range of software licenses including those with multiple conditions). As explained above, the IBM Tivoli License Manager program applies the software licenses to the software installations in an order based on the type of condition in each license, and a predetermined order of such conditions. After all the licenses are applied to the software installations, if none of the software licenses covers/license one or more of the software installations, then such one or more software licenses are not licensed. The software license optimizing program of US Patent Application entitled "System, Method and Program Product To Identify Unutilized or Underutilized Software License", Ser. No. 11/157,397, filed by J. Marsnik, O. Nalamwar and T. Smalley on Jun. 21, 2005 applies the software licenses to the software installations based on the type of condition in each license, and different orders of such conditions in different iterations of the program. After all the licenses are applied in the different orders to the software installations, if none of the licenses covers/licenses one or more software installations in any of the orders, then such one or more software installation are not licensed.

Figure 1:
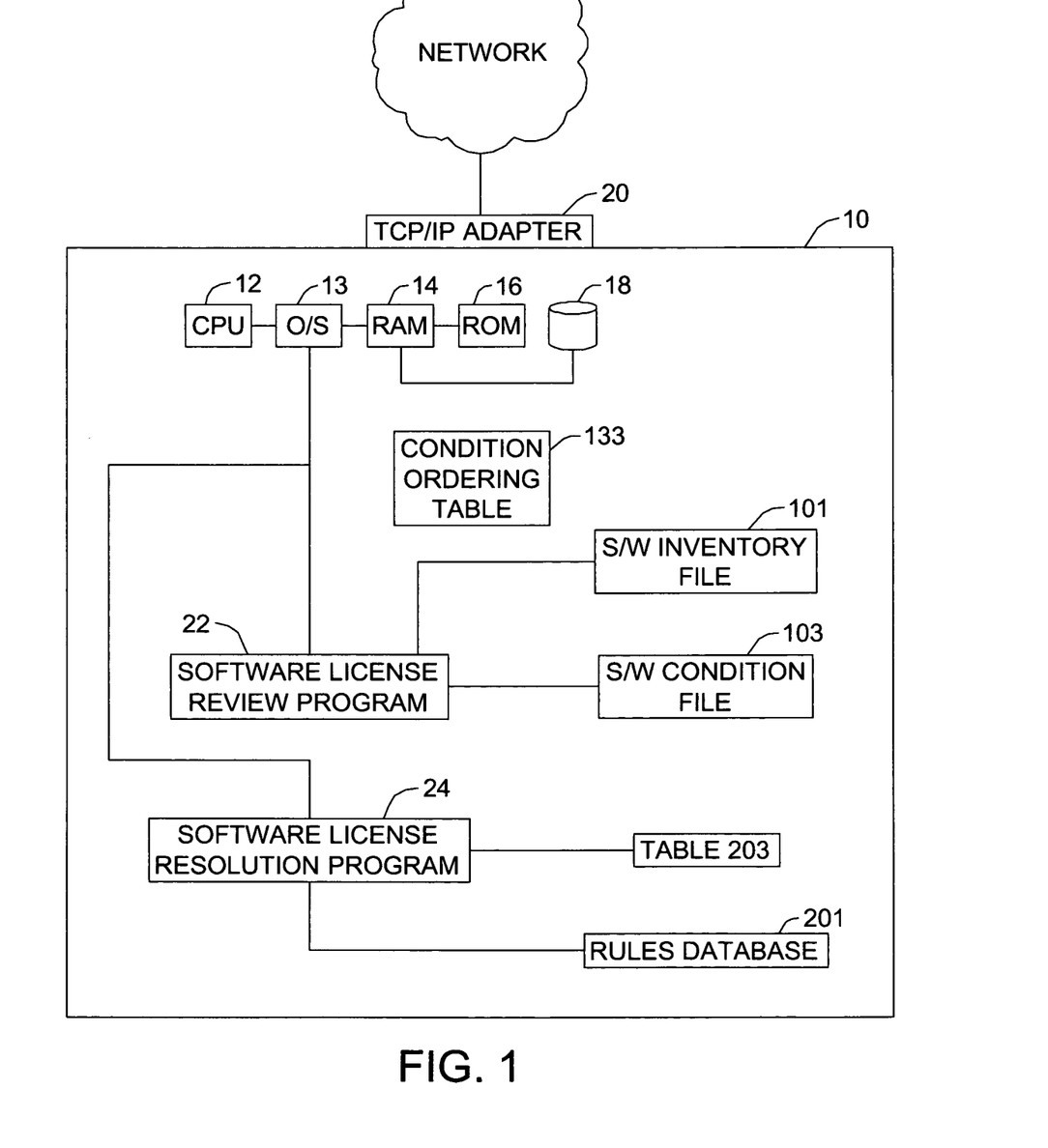
FIG. 1 is a block diagram of a computer system in which the present invention is incorporated.

Computer 10 also includes a software license resolution program 24 according to the present invention. Program 24 determines what to do when a software installation in one of the company's computers is not covered/licensed by an existing software license. As explained in more detail below, program 24 has expert system rules to determine when to (a) decommission/delete this software from all computers of the company, (b) decommission/delete an installation of the software on any computer of the company so that an existing license has sufficient scope (or "room") to license the remaining software installation(s), (c) move the currently unlicensed software to another computer where it will be properly licensed under an existing license (such as a geographic location license or CPU license), (d) renegotiate an existing license to extend/expand the scope of the existing license to cover the currently unlicensed software installation, or (e) purchase a new license to cover the currently unlicensed software installation. Program 22 and 24 are stored on computer readable storage 18 for execution by CPU 12 via memory.

Figure 2:
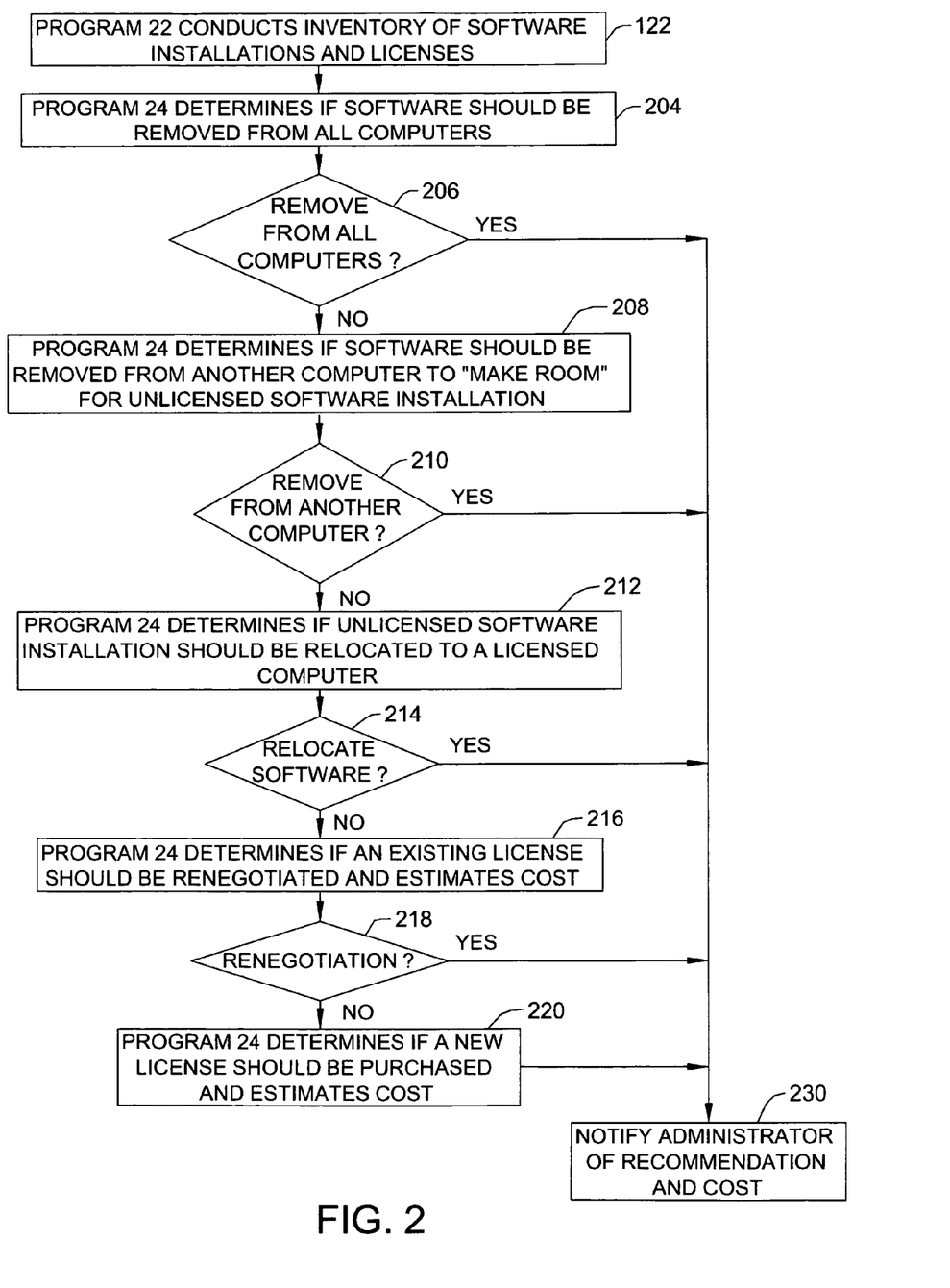
FIG. 2 is a flow chart of a software license resolution program within the computer system of FIG. 1 according to the present invention.

FIG. 2 illustrates the functional steps and operation of program 22 and program 24 in more detail. In step 122, program 22 conducts an inventory of each type of software which is currently installed in computers of a company, for example, the user's company or the user's customer. The inventory identifies each computer (and its serial number) on which the type of software is installed, the geographic location of the computer, and the number of installed copies of the type of software. If there are other conditions or restrictions on usage specified in the associated software licenses (such as listed below), the inventory can identify other, corresponding characteristics of the usage. Program 22 conducts this inventory by querying configuration files and other files for the computers containing this information. Program 22 records the results of the software usage inventory in a table or file 101 (shown in FIG. 1). Before, after or concurrent with software installation inventory, the user conducts an inventory of the software licenses for this type of software used by the one company. The inventory identifies the type(s) of usage condition(s) or restriction(s) in each software license. After conducting the inventory, the user populates a table or file 103 (shown in FIG. 1) with fields and predetermined key words for the different types of conditions or restrictions. By way of example, a condition or restriction may state the following:

(a) The type of software can only be used on a specified computer (typically specified by the computer CPU serial number), with no restriction on the number of copies that can be installed on the specified computer or the geographic location of the specified computer. In file 103, this type of license is referenced by the key word, "CPU Serial #".

(b) The type of software can only be used at a specified geographic location of the computer CPU, with no restriction on the number of computers at that geographic location on which the type of software can be installed or the number of copies of the software that can be installed at that geographic location. In file 103, this type of license is referenced by the key word, "Location City XYZ".

(c) The total number of copies of the type of software that can be used, with no restriction on the number of computer CPUs on which the software can be installed or the geographic location of the computer CPUs on which the software can be installed. In file 103, this type of license is referenced by the key word, "Number of Copies #".

(d) The maximum processing power of a computer CPU on which the type of software can be used, with no restriction on the number of copies that can be installed on the computer or the geographic location of the computer.
(e) The business unit which uses software.
(f) The number of Logical Partitions ("LPARS") in which the software can be used.
(g) The number of actual users of the software program.
(h) The number of computers or server "nodes" on which the software can be installed.
(i) A type of computer (such as production, development, etc.) on which the software can be installed.

After performing the inventory of the software licenses, program 22 records the results of the software usage inventory in file 103.

In one example, there are five software licenses applicable to the same type of software for the one company. In this example, each of the software licenses has only one of the following restrictions: (i) computer CPU serial number in which the software can be installed (unlimited number of copies on the computer, unrestricted geographic location of the computer CPU), (ii) geographic location of the computer CPU in which the software can be installed (unlimited number of computers at the geographic location in which the software can be installed, unlimited number of copies that can be installed on the computer(s) at the geographic location), or (iii) total number of copies of the software that can be installed (unlimited number of computer CPUs up to the total number of copies, unrestricted geographic location of the computer CPUS). In this example, license #1 has only the condition of computer CPU serial number, license #2 has only the condition of geographic location of the computer CPU, license #3 has only the condition of total number of copies of the software, license #4 has only the condition of geographic location of the computer CPU, and license #5 has only the condition of the computer CPU serial number. It should be noted that the foregoing example is just one possible example. Program 22 can evaluate other types of software licenses with other types of individual conditions or combinations of conditions (in a single license).

As described below, in one embodiment of program 22 (as described in Copending US Patent Application entitled "System, Method and Program Product To Identify Unutilized or Underutilized Software License", Ser. No. 11/157,397, filed by J. Marsnik, O. Nalamwar and T. Smalley on Jun. 21, 2005, program 22 compares the software licenses to the software inventory in different orders of the software license conditions; one or more of the orders will reveal the most excesses, if any, in the software licenses. If there are such excesses, this represents an opportunity to terminate or reduce the scope of the excess software license(s), and thereby, reduce the license fees. Conversely, if none of the existing software licenses covers one or more of the software installations during any order of applying the software licenses, then such one or more software installations are unlicensed (or noncompliant with existing licenses), and program 22 invokes program 24 to determine how to resolve this problem. In some cases, there is no license whatsoever for the subject software installation. In other cases, there is a software license intended for the software installation, but the software installation does not comply with one or more conditions of the intended license. For example, the intended software license may be limited to a CPU of a certain maximum processing power, and the actual software installation may be on a computer with greater processing power. In either case (either no license or an inadequate license), the software installation is considered unlicensed.

Thus, after program 22 identifies one or more software installations as being unlicensed in step 100 and invokes program 24, program 24 determines a course of action to satisfy the licensee's needs without violating the copyright laws or breaching an existing software license. In other words, program 24 will determine a course of action that will result in all (remaining) software installations of the company being properly licensed. As explained in more detail below, program 24 will determine the viability and desirability of the following remedies, preferably in the following order: (a) decommission/delete the software from all computers of the company, (b) decommission/delete an installation of this software on another computer of the company so that an existing license has sufficient scope (or "room") to license the currently unlicensed software installation, (c) move the currently unlicensed software to another computer where it will be properly licensed under an existing license of the company, (d) renegotiate and expand an existing license of the company to extend the existing license to the currently unlicensed software installation, or (e) purchase a new license to cover the currently unlicensed software installation.

Accordingly, in step 204, program 24 determines if the currently unlicensed software installation should be decommissioned/deleted from all computers of the company, based on the following expert system rules in a rules data base 201:
(a) An administrator previously classified the software installation as "non critical", and previously recorded this classification in a table 203, and any one of the following situations applies:
(i) the software has not been used for a past, predetermined time period, such as thirteen months, on any computer of the company. (Each time the software has been used, the operating system 13 records the date of such use in table 203); or
(ii) the software has been used "lightly" for a past, predetermined time period, such as thirteen months, on all computers of the company and an administrator previously recorded in table 203 that comparable software is currently installed on a computer of the company. (Program 24 determines "light" usage by comparing the number of uses recorded in table 203 to a threshold previously recorded by the administrator in table 203); or
(iii) the software has been used lightly for a past, predetermined time period, such as thirteen months, on all computers of the company and the usage has been decreasing faster than a predetermined rate (as indicated by the records in table 203); or
(iv) an administrator previously made a record in table 203 that the customer intends to discontinue use of this software; or
(v) the currently unlicensed software installation has not been accessed for a past, predetermined time period, such as thirteen months; or
(vi) the software is responsible for a predetermined percentage or more of the licensee's important failures ("business capabilities failures") in the last year (based on records previously entered by a support person in table 203), and is functionally redundant to another installed software product (based on records previously entered by an administrator in table 203).

If the company's situation permits the resolution considered in step 204, then program 24 notifies the administrator of this recommended resolution (decision 206, yes branch), and that the cost is low, i.e. the labor cost of decommissioning the software from all computers of the company (step 230). There is no additional license fee. In addition, if one or more software licenses can be terminated due to the decommissioning of the software based on the recommendation of step 204, and there is an ongoing cost associated with the one or more software licenses as recorded in file 103, program will notify the administrator of the potential cost savings.

If the software installation cannot be decommissioned/deleted from all the computers of the company based on the rules of step 204 (decision 206, no branch), program 24 determines if the software type of the currently unlicensed software installation can be decommissioned/deleted from another computer of the company to "make room" for the currently unlicensed software installation under an existing license (step 208), based on the following rules:

(b) the software is installed on another computer of the company, the software was substantially underutilized there (based on the records previously entered by operating system 13 in table 203 as to usage of the software and a usage threshold previously entered by the administrator in table 203 representing substantial under utilization), and an existing license would cover the currently unlicensed installation if the software was decommissioned/deleted from this other computer. For example, there may be an existing license that is limited to total number of installed copies or total number of sites where the software is installed, and the license is currently at its limit, and decommissioning of the software at the other computer would make room for currently unlicensed software installation. In such a case, the currently unlicensed software installation can be decommissioned/deleted on this other computer, and the company can rely on the existing license to license the currently unlicensed software installation.

If the company's situation permits the resolution considered in step 208, then program 24 notifies the administrator of this recommended resolution (decision 210, yes branch), and that the cost is low, i.e. the labor cost of decommissioning the unlicensed software installation at the other computer (step 230). There is no additional license fee.

If the unlicensed software installation cannot be decommissioned/deleted based on the rules of step 208 (decision 210, no branch), program 24 determines if the software of the currently unlicensed installation can be relocated to another computer of the company, i.e. installed on another computer of the company under an existing, underutilized license and the currently unlicensed software installation decommissioned/deleted (step 212), based on the following rules:

(c) an existing license of the company permits installation of the software on another computer with sufficient resources— CPU, RAM, etc. (as program 24 determines by query of configuration files of this other computer and comparison to resource data previously entered by the administrator in table 203 indicating resource requirements of the software) to effectively execute the software, without additional charge or with substantially less charge than another, new license of the same type.

If the company's situation permits the resolution considered in step 212, then program 24 notifies the administrator of this recommended resolution (decision 214, yes branch), and that the cost is low, i.e. the labor cost of relocating the software from the computer of the unlicensed installation to another computer of the company (step 230). There is no additional license fee.

If the software installation cannot be moved to another computer and licensed under an existing, underutilized license at this other computer based on the rules of step 212 (decision 214, no branch), program 24 determines if an attempt should be made to renegotiate an existing license of the company for this software to expand it to license the currently unlicensed software installation (step 216), based on the following rules:

(d) The administrator on behalf of the company has previously recorded in table 203 an intent of the company to retain and invest in this type of software. Also, there is an existing license for another installation of this software on another computer or an existing license intended for the current installation (which is inadequate in some respect, such as a limit on processor power or geographic location, for the current installation) which will expire in less than a predetermined time period, such as nine months. In such a case, program 24 will estimate a cost for an expanded license to cover the currently unlicensed installation. Program 24 estimates the cost for licensing the unlicensed software installation based on a fixed, predetermined percentage (such as 25%) of the total license fee for the existing license plus the total license fee for the existing license divided by the number of copies licensed under the existing license.

If the company's situation permits the resolution considered in step 216, then program 24 notifies the administrator of this recommended resolution (decision 218, yes branch), and the estimated cost as noted above (step 230).

If an existing software license should not be renegotiated and expanded to license the currently unlicensed software installation based on the rule of step 216 (decision 218, no branch), program 24 determines if another, new license should be purchased for the currently unlicensed installation (step 220), based on the following rules:

(e) The administrator previously recorded in table 203 that it is critical to the company to keep the currently unlicensed software installation on the same computer. In such a case, program 24 will estimate a cost for the new license for the currently unlicensed software installation. Program 24 estimates this cost for the new license as the same cost for any comparable existing license (based on data in table 103). If there is no such comparable existing license, program 24 program 24 will estimate the cost for the new license to license the unlicensed software installation based on a fixed, predetermined percentage (such as 25%) of the total license fee for the existing license plus the total license fee for the existing license divided by the number of copies licensed under the existing license.

After step 220, program 24 notifies the administrator of this recommended resolution (step 230), and the estimated cost as noted above.

It should be noted that the order of the steps 204, 208, 212, 216 and 220 is generally the order of lower cost to higher cost to the company of the resolution, i.e. to maximize the license cost reductions or minimize the additional license cost, as the case may be. In other words, complete removal of the software from all the computers of the company following step 204 will lower the cost to the company (if the existing licenses have ongoing charges). The removal of a single software installation following step 208 may also lower the cost to the company (if there is a license intended for the software installation, but is inadequate) but not as much as complete removal of the software from all the computers of the company. In other cases, the removal of the single software installation following step 208 will be neutral as far as cost. The relocation of the software from the currently unlicensed installation to another, licensed computer following step 212 will be neutral as far as cost to the company (except for the labor involved). The renegotiation/expansion of an existing license following step 216 will likely entail some additional cost to the company. The purchase of a new license following step 220 will likely entail greater cost than renegotiation/expansion of an existing license in step 216. So, the earlier in the sequence of steps 204, 208, 212, 216 and 220 that program 24 determines the respective resolution to be viable based on the rules in database 201, the more economical the recommendation by program 24 to the company.

If program 24 reaches a recommendation in steps 204, 208, 212, 216 or 220 to (a) decommission/delete the software from all computers of the company, (b) decommission/delete another installation of this software on another computer of the company so that an existing license has sufficient scope to license the currently unlicensed software installation, (c) move the currently unlicensed software to another computer where it will be properly licensed under an existing license of the company, (d) renegotiate an existing license of the company to extend the existing license to the currently unlicensed software installation, or (e) purchase a new license to cover the currently unlicensed software installation, then program 24 notifies the administrator in step 230 as explained above. In the illustrated embodiment of program 24, when program 24 first determines satisfaction of one of the foregoing recommendations listed above in step 204, 208, 212, 216 or 220 in that order, program 24 notifies the administrator of the recommendation (and cost) in step 230, and does not consider the other possible resolutions which appear downstream/later in the flowchart of FIG. 2. However, in another embodiment of program 24, program 24 considers all the possible resolutions of steps 204, 208, 212, 216 and 220 (and their respective costs) in the case of all installations of software being licensed properly, and notifies the administrator in step 230 which possible resolutions comply with the rules in rules database 201 and their cost. This allows the administrator to choose amongst all possible acceptable resolutions.

Programs 22 and 24 can be loaded into computer 10 from a computer storage medium such as magnetic disk or tape, optical CD ROM, DVD or the like onto RAM or hard drive, or downloaded from the Internet and TCP/IP adapter card 20.

Based on the foregoing, a system, method and program product for determining what to do when an unlicensed software installation is identified, have been disclosed. However, numerous modifications and substitutions can be made without deviating from the scope of the present invention. For example, in the case of all installations of a software type being properly licensed, program 24 can determine if there are any opportunities to reduce the scope of the current licenses and, thereby, gain savings in future licensing costs. Therefore, the present invention has been disclosed by way of illustration and not limitation, and reference should be made to the following claims to determine the scope of the present invention.

The invention claimed is:

1. A computer implemented method for resolving an unlicensed installation of a type of software in a first computer of a company, said method comprising the steps of:
   automatically determining, by electronically querying at least one computer file, that said type of software has been used by the company more than a predetermined threshold level during a predetermined period of time;
   automatically determining, by electronically querying at least one computer file, that said type of software is currently installed on a second computer of said company;
   automatically determining, by electronically querying at least one computer file, that said company has an existing license which permits multiple copies of said software to be installed on said second computer; and
   based at least in part on (a) the determination that said company has an existing license which permits multiple copies of said software to be installed on said second computer, and (b) the determination that said type of software has been used by the company more than said predetermined threshold level during a predetermined period of time, automatically determining, and generating a computer record indicating, that a solution to said unlicensed installation of said type of software on said first computer is to uninstall said unlicensed software from said first computer and install another copy of the software in said second computer under said existing license in addition to the software of said type which is currently installed on said second computer.

2. A method as set forth in claim 1 further comprising the step of automatically determining, by electronically querying at least one computer record, that said type of software has exhibited less than a threshold number of execution problems during a predetermined time period or said type of software is substantially different in function than other software installed in a computer of said company; and wherein
   said step of automatically determining, and generating a computer record indicating, that a solution to said unlicensed installation in said first computer of said type of software is to uninstall said unlicensed software from said first computer and install another copy of the software in said second computer under said existing license in addition to the software of said type which is currently installed on said second computer, is also based on said step of automatically determining that said type of software has exhibited less than a threshold number of execution problems during a predetermined time period or is substantially different in function than other software installed in a computer of said company.

3. A method as set forth in claim 1 further comprising the step of automatically determining, by electronically querying at least one computer record, that said second computer has sufficient available processing power to satisfy specified processor requirements for another copy of said software in addition to software which is currently installed on said second computer; and wherein
   said step of automatically determining, and generating a computer record indicating, that the software of said unlicensed software installation can be removed from said first computer and installed on said second computer under said existing license in addition to the software of said type which is currently installed on said second computer, is also based on said step of determining that said second computer has sufficient available processing power to satisfy said specified processor requirements for another copy of said software of said type in addition to software which is currently installed on said second computer.

4. A method as set forth in claim 1 wherein said license permits multiple copies of said type of software to be installed on a single computer with less than a predetermined processor power, and further comprising the step of automatically determining, by electronically querying at least one computer file, that said second computer has less than said predetermined processing power.

5. A method as set forth in claim 1 wherein, in response to the step of automatically determining, and generating a computer record indicating, that a solution to said unlicensed installation of said type of software is to uninstall the unlicensed software from said first computer and install another copy of the software in said second computer under said existing license in addition to the software of said type which is currently installed on said second computer, further comprising the step of uninstalling the unlicensed software from said first computer and installing another copy of the software in said second computer.

6. A computer program product for resolving an unlicensed installation of a type of software in a first computer of a company, said computer program product comprising:

a computer readable storage media;

first program instructions to automatically determine, by electronically querying at least one computer file, that said type of software has been used by the company more than a predetermined threshold level during a predetermined period of time;

second program instructions to automatically determine, by electronically querying at least one computer file, that said type of software is currently installed on a second computer of said company;

third program instructions to automatically determine, by electronically querying at least one computer file, that said company has an existing license which permits multiple copies of said software to be installed on said second computer; and fourth program instructions, responsive at least in part to (a) the determination that said company has an existing license which permits multiple copies of said software to be installed on said second computer, and (b) the determination that said type of software has been used by the company more than said predetermined threshold level during a predetermined period of time, to automatically determine, and generate a computer record indicating, that a solution to said unlicensed installation of said type of software on said first computer is to uninstall said unlicensed software from said first computer and install another copy of the software in said second computer under said existing license in addition to the software of said type which is currently installed on said second computer; and wherein said first, second, third and fourth program instructions are stored on said computer readable storage media.

7. A computer program product as set forth in claim 6 further comprising:

fifth program instructions to automatically determine, by electronically querying at least one computer record, that said type of software has exhibited less than a threshold number of execution problems during a predetermined time period or said type of software is substantially different in function than other software installed in a computer of said company; and wherein said fourth program instructions, automatically determine, and generate a computer record indicating, that a solution to said unlicensed installation in said first computer of said type of software is to uninstall said unlicensed software from said first computer and install another copy of the software in said second computer under said existing license in addition to the software of said type which is currently installed on said second computer, based also on said fifth program instructions which automatically determine that said type of software has exhibited less than a threshold number of execution problems during a predetermined time period or is substantially different in function than other software installed in a computer of said company; and said fifth program instructions are stored on said computer readable storage media.

8. A computer program product as set forth in claim 6 further comprising fifth program instructions to automatically determine, by electronically querying at least one computer record, that said second computer has sufficient available processing power to satisfy specified processor requirements for another copy of said software in addition to software which is currently installed on said second computer; and wherein said fourth program instructions automatically determine, and generate a computer record indicating, that the software of said unlicensed software installation can be removed from said first computer and installed on said second computer under said existing license in addition to the software of said type which is currently installed on said second computer, based also on said fifth program instructions which determine that said second computer has sufficient available processing power to satisfy said specified processor requirements for another copy of said software of said type in addition to software which is currently installed on said second computer; and said fifth program instructions are stored on said computer readable storage media.

9. A computer program product as set forth in claim 6 wherein said license permits multiple copies of said type of software to be installed on a single computer with less than a predetermined processor power, and further comprising fifth program instructions to automatically determine, by electronically querying at least one computer file, that said second computer has less than said predetermined processing power; and wherein said fifth program instructions are stored on said computer readable storage media.

10. A computer system for resolving an unlicensed installation of a type of software in a first computer of a company, said computer system comprising:

a CPU, a computer readable storage media and a memory;

first program instructions to automatically determine, by electronically querying at least one computer file, that said type of software has been used by the company more than a predetermined threshold level during a predetermined period of time;

second program instructions to automatically determine, by electronically querying at least one computer file, that said type of software is currently installed on a second computer of said company;

third program instructions to automatically determine, by electronically querying at least one computer file, that said company has an existing license which permits multiple copies of said software to be installed on said second computer; and fourth program instructions, responsive at least in part to (a) the determination that said company has an existing license which permits multiple copies of said software to be installed on said second computer, and (b) the determination that said type of software has been used by the company more than said predetermined threshold level during a predetermined period of time, to automatically determine, and generate a computer record indicating, that a solution to said unlicensed installation of said type of software on said first computer is to uninstall said unlicensed software from said first computer and install another copy of the software in said second computer under said existing license in addition to the software of said type which is currently installed on said second computer; and wherein said first, second, third and fourth program instructions are stored on said computer readable storage media for execution by said CPU via said memory.

11. A computer system as set forth in claim 10 further comprising:

fifth program instructions to automatically determine, by electronically querying at least one computer record, that said type of software has exhibited less than a threshold number of execution problems during a predetermined time period or said type of software is substantially different in function than other software installed in a computer of said company; and wherein said fourth program instructions, automatically determine, and generate a computer record indicating, that a solution to said unlicensed installation in said first computer of said type of software is to uninstall said unlicensed software from said first computer and install another copy of the software in said second computer under said existing license in addition to the software of said type which is currently installed on said second computer, based also on said fifth program instructions which automatically determine that said type of software has exhibited less than a threshold number of execution problems during a predetermined time period or is substantially different in function than other software installed in a computer of said company; and said fifth program instructions are stored on said computer readable storage media for execution by said CPU via said memory.

12. A computer system as set forth in claim 10 further comprising fifth program instructions to automatically determine, by electronically querying at least one computer record, that said second computer has sufficient available processing power to satisfy specified processor requirements for another copy of said software in addition to software which is currently installed on said second computer; and wherein said fourth program instructions automatically determine, and generate a computer record indicating, that the software of said unlicensed software installation can be removed from said first computer and installed on said second computer under said existing license in addition to the software of said type which is currently installed on said second computer, based also on said fifth program instructions which determine that said second computer has sufficient available processing power to satisfy said specified processor requirements for another copy of said software of said type in addition to software which is currently installed on said second computer; and said fifth program instructions are stored on said computer readable storage media for execution by said CPU via said memory.

13. A computer system as set forth in claim 10 wherein said license permits multiple copies of said type of software to be installed on a single computer with less than a predetermined processor power, and further comprising fifth program instructions to automatically determine, by electronically querying at least one computer file, that said second computer has less than said predetermined processing power; and wherein said fifth program instructions are stored on said computer readable storage media for execution by said CPU via said memory.

* * * * *